(12) United States Patent
Goroff et al.

(10) Patent No.: US 8,738,958 B2
(45) Date of Patent: May 27, 2014

(54) RECOVERY NODE TESTING

(75) Inventors: Marc Goroff, Livermore, CA (US); Hung-Min Yang, San Jose, CA (US)

(73) Assignee: QuorumLabs, Inc., Fremont, CA (US)

( * ) Notice: Subject to any disclaimer, the term of this patent is extended or adjusted under 35 U.S.C. 154(b) by 438 days.

(21) Appl. No.: 13/164,752

(22) Filed: Jun. 20, 2011

(65) Prior Publication Data

US 2012/0324281 A1 Dec. 20, 2012

(51) Int. Cl.
*G06F 11/00* (2006.01)

(52) U.S. Cl.
USPC ............ 714/4.1; 714/4.11; 714/4.12; 714/25; 714/27; 714/28

(58) Field of Classification Search
USPC .................. 714/4.1, 4.11, 4.12, 25, 27, 28
See application file for complete search history.

(56) References Cited

U.S. PATENT DOCUMENTS

| | | | |
|---|---|---|---|
| 7,165,186 B1 | 1/2007 | Viswanatham et al. | |
| 7,370,233 B1 * | 5/2008 | Sobel et al. | 714/15 |
| 7,409,577 B2 * | 8/2008 | Wing et al. | 714/4.12 |
| 7,610,511 B2 | 10/2009 | Fujita et al. | |
| 7,617,414 B2 * | 11/2009 | Becker et al. | 714/15 |
| 7,689,859 B2 * | 3/2010 | Westenberg | 714/6.11 |
| 8,020,037 B1 * | 9/2011 | Schwartz et al. | 714/6.3 |
| 8,086,900 B2 * | 12/2011 | Haley et al. | 714/36 |
| 8,230,267 B2 * | 7/2012 | Noller et al. | 714/45 |
| 8,332,689 B2 * | 12/2012 | Timashev et al. | 714/15 |
| 8,402,309 B2 * | 3/2013 | Timashev et al. | 714/15 |
| 8,566,640 B2 * | 10/2013 | Timashev et al. | 714/15 |
| 2004/0172574 A1 * | 9/2004 | Wing et al. | 714/4 |
| 2006/0242211 A1 * | 10/2006 | Becker et al. | 707/204 |
| 2007/0159974 A1 * | 7/2007 | Fabbri et al. | 370/232 |
| 2008/0244321 A1 * | 10/2008 | Kelso | 714/38 |
| 2008/0281879 A1 | 11/2008 | Kawamura | |
| 2009/0265706 A1 | 10/2009 | Golosovker et al. | |
| 2010/0077250 A1 | 3/2010 | Koh et al. | |
| 2011/0087874 A1 * | 4/2011 | Timashev et al. | 713/100 |
| 2013/0254587 A1 * | 9/2013 | Han et al. | 714/4.4 |

OTHER PUBLICATIONS

Avent Technology Solutions, Data De-Duplication Made Simple Taking the Sting Out of Exponential Data Growth, accessed Nov. 25, 2009, pp. 1-7.

* cited by examiner

*Primary Examiner* — Joshua P Lottich
(74) *Attorney, Agent, or Firm* — SoCal IP Law Group LLP; Jonathan Pearce; Steve C. Sereboff

(57) ABSTRACT

There is disclosed a recovery node testing system and method. The system and method include copying a protected server image associated with a protected server to a test node and creating a test environment for the test node, the test environment including at least one of the network characteristics of the protected server. The test node may then be activated using the protected server image which may then be connected to the virtual network. Once connected, at least one test is performed on the test node to confirm that the protected server image operating on the test node responds in the same manner as the protected server.

19 Claims, 4 Drawing Sheets

Recovery Node Test Procedure

© QuorumLabs, Inc..

RECOVERY NODE TESTING

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

1. Field

This disclosure relates to recovery node testing of computer systems.

2. Description of the Related Art

Computer system failures can be catastrophic for government, corporate and other entities. In the case of government computer systems, highly confidential information or information that demands constant, immediate access may be lost or unavailable for extended periods of time in the event of a system failure. In the case of corporate and other entities, millions of dollars may be lost in sales, records, corporate data or other information if a computer system is down for even a few hours. In the worst cases, data may be lost permanently.

Recovery from such computer system failures is, therefore, of paramount importance to system administrators. In the most desirable situations, recovery is immediate and complete without any noticeable downtime or change to the users of the system. In order to ensure such continuity, some systems employ "hot" backup systems or load sharing in order to provide immediate availability in the event of a single or few systems failing. Even with this immediate availability, this does not address the potential situation in which an entire group of servers becomes unavailable for whatever reason.

Backup systems typically create copies of important data. More advanced systems may create images of systems so that the systems may be restored to a state identical to that preceding the failure. Some systems provide means to restore systems using these images in order to determine whether the images are functioning properly. These backup systems may restore the computer system itself (or one identical thereto), thereby destroying the current state of that system.

Throughout this description, elements appearing in figures are assigned three digit reference designators, where the most significant digit is the figure number where the element is introduced and the two least significant digits are specific to the element. An element that is not described in conjunction with a figure may be presumed to be the same as a previously-described element having the same reference designator.

DETAILED DESCRIPTION

Description of Apparatus

Figure 1:
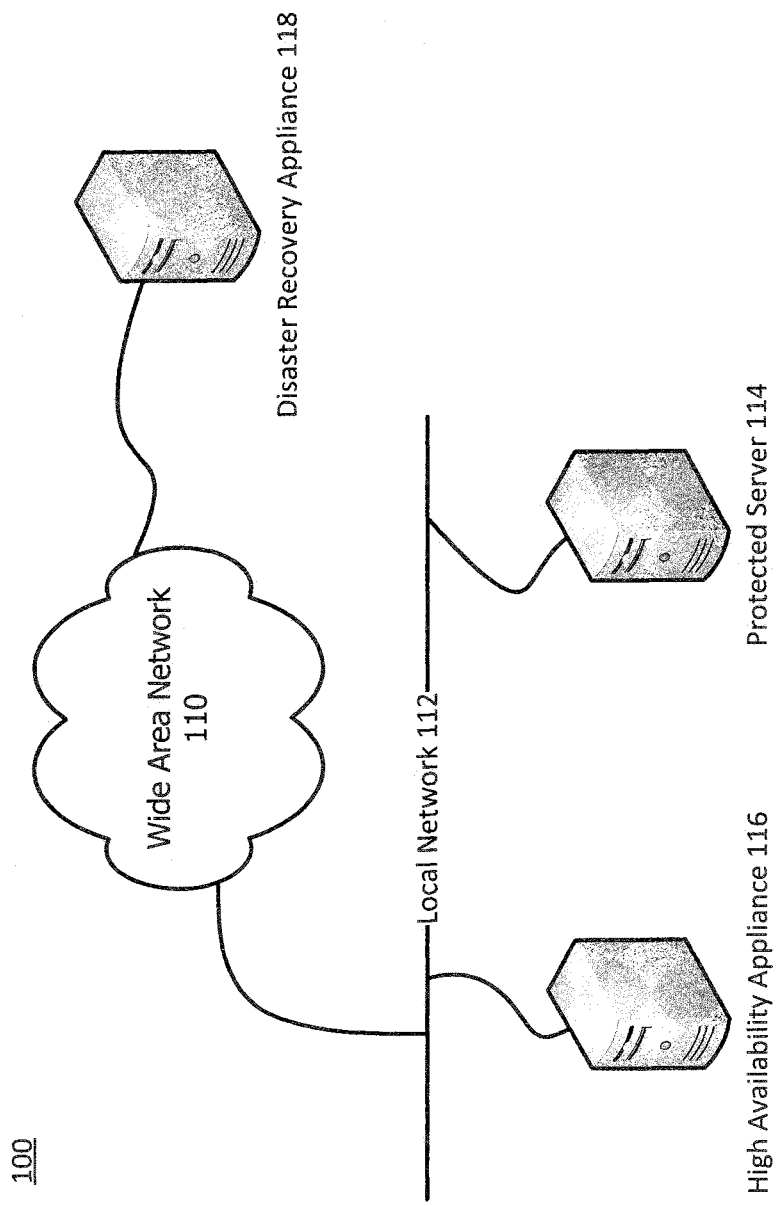
FIG. 1 is a diagram of a network.

Referring now to FIG. 1, a network 100 is shown. The network 100 includes a wide area network 110 connected to a local network 112. The local network 112 includes a protected server 114 and a high availability appliance 116. A disaster recovery appliance 118 is connected to the wide area network 110.

The wide area network 110 may be a wide area network (WAN), a local network (LAN), the Internet or any number of other networks. The wide area network 110 may be implemented locally by physically connected computers or may be distributed over a wide area.

The local network 112 is a discrete subcomponent of the wide area network 110. The local network 112 may be a local area network, a wide area network or any number of other networks. The protected server 114 and the high availability appliance 116 operate on the local network 112.

The protected server 114 is a computing device, such as the computing device 200 described below with reference to FIG. 2, that is being protected by a disaster recovery system. The protected server 114 may be a server computer operating a web server, a database server or any number of other functions. The protected server 114 is shown as a single server, but many protected servers like the protected server 114 may be associated with the local network 112. Each protected server 114 is associated with a high availability appliance 116 and a disaster recovery appliance 118. The protected server 114 is shown and described as a server computer, but the protected server 114 may be or include other types of computers and computing systems.

The high availability appliance 116 is a server computer, such as the computing device 200 described with reference to FIG. 2, associated with the protected server 114. The high availability appliance 116 incorporates or has ready access to a bootable image of the operating system, software, network configuration, data and all other settings of the protected server 114 with which it is associated. In the event of a system failure of the protected server 114, the high availability appliance 116 may be used to operate as virtual machine in place of the protected server 114.

The disaster recovery appliance 118 is also a server computer, such as the computing device 200 described with reference to FIG. 2, associated with the protected server 114 and is intentionally not on the same local network 112. The disaster recovery appliance 118 includes or has access to a bootable image of the protected server 114 that is identical to that maintained on the high availability appliance 116. In the event of the failure of both the protected server 114 and the high availability appliance 116, the disaster recovery appliance 118 may also be used to begin operation in place of the protected server 114.

Figure 2:
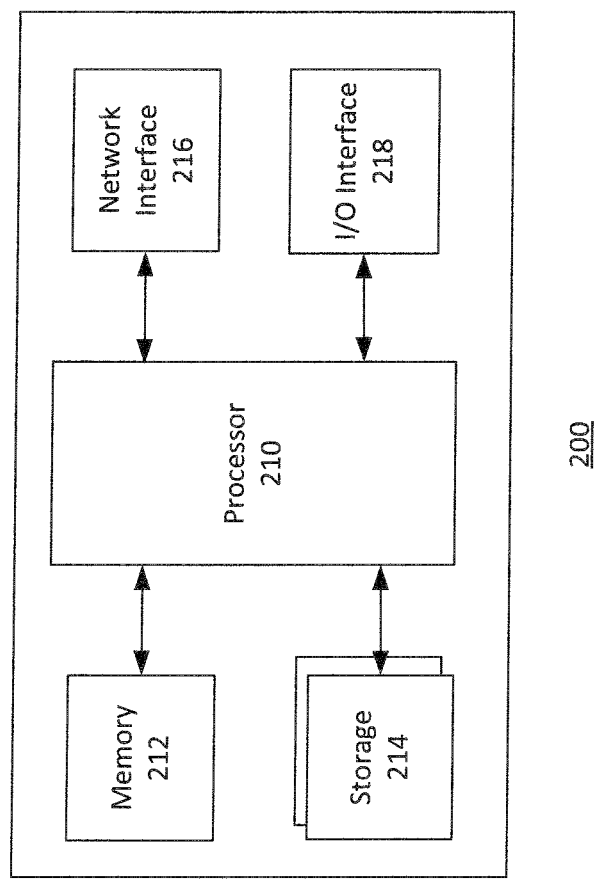
FIG. 2 is a diagram of a computing device.

Turning now to FIG. 2 there is shown a computing device 200, which is representative of the computers herein. The computing device 200 may include software and/or hardware for providing functionality and features described herein. The computing device 200 may therefore include one or more of logic arrays, memories, analog circuits, digital circuits, software, firmware and processors. The hardware and firmware components of the computing device 200 may include various specialized units, circuits, software and interfaces for providing the functionality and features described herein.

The computing device 200 has a processor 210 coupled to a memory 212, storage 214, a network interface 216 and an I/O interface 218. The processor may be or include one or more microprocessors, field programmable gate arrays (FPGAs), application specific integrated circuits (ASICs), programmable logic devices (PLDs) and programmable logic arrays (PLAs).

The memory 212 may be or include RAM, ROM, DRAM, SRAM and MRAM, and may include firmware, such as static data or fixed instructions, BIOS, system functions, configuration data, and other routines used during the operation of the computing device 200 and processor 210. The memory 212 also provides a storage area for data and instructions associated with applications and data handled by the processor 210.

The storage 214 provides non-volatile, bulk or long term storage of data or instructions in the computing device 200. The storage 214 may take the form of a disk or other addressable or serial storage medium. Multiple storage devices may be provided or available to the computing device 200. Some of these storage devices may be external to the computing device 200, such as network storage or cloud-based storage. In this patent, the term "storage medium" does not encompass transient media such as signals and waveforms that convey, but do not store information.

The network interface 216 includes an interface to a network such as network 110 (FIG. 1).

The I/O interface 218 interfaces the processor 210 to peripherals (not shown) such as displays, keyboards, pointing devices and USB devices.

Figure 3:
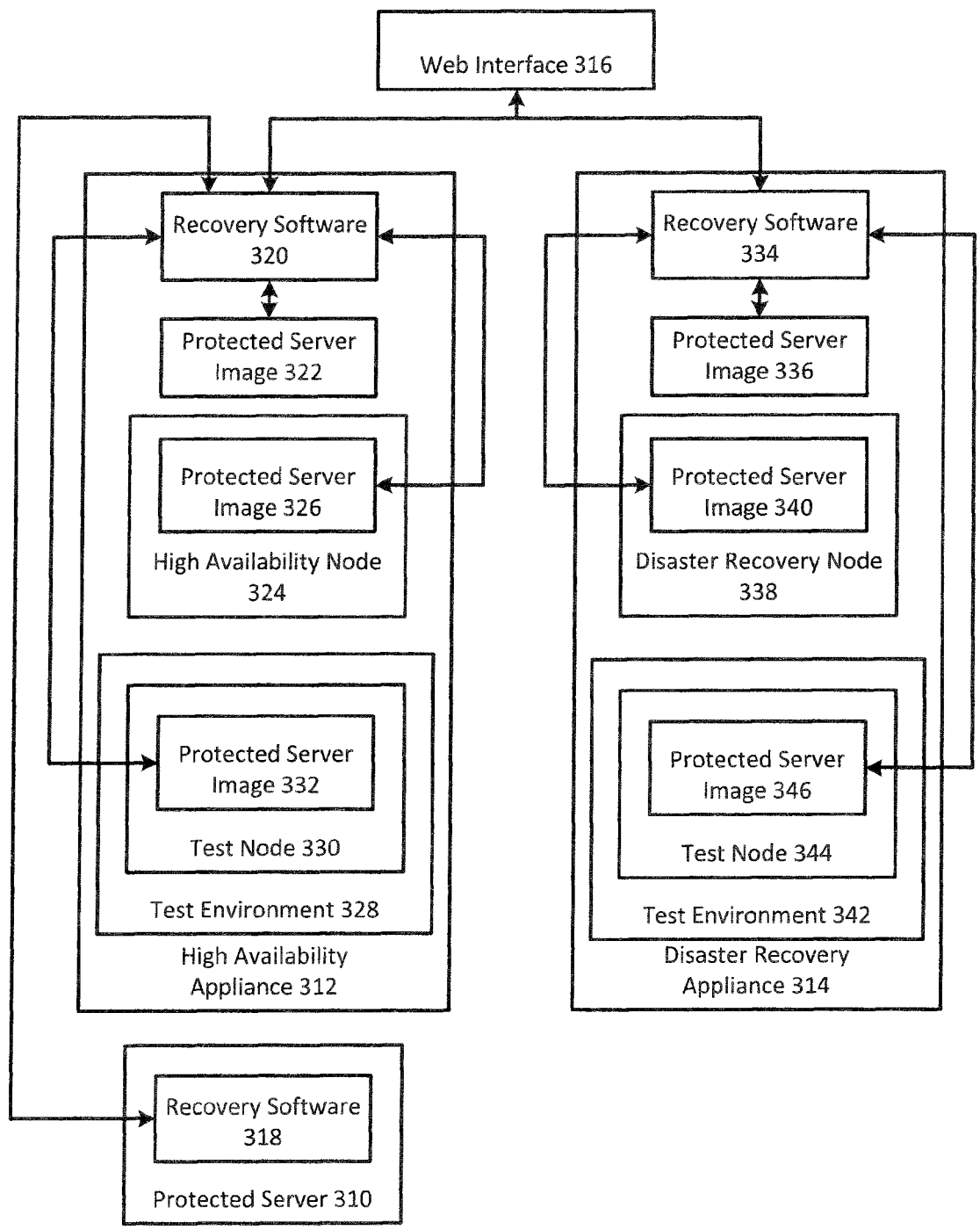
FIG. 3 is a diagram of a recovery node test system.

Turning now to FIG. 3, a recovery node test system 300 is shown. The system 300 consists of a protected server 310, a high availability appliance 312 and a disaster recovery appliance 314. These are the protected server 114, high availability appliance 116 and disaster recovery appliance 118 of FIG. 1, respectively. A web interface 316 is also a part of the system 300.

The protected server 310 includes recovery software 318. The high availability appliance 312 includes recovery software 320 and a high availability node 324 which in turn includes a protected server image 326. In addition, the high availability appliance 312 includes, as-needed, a test environment 328 including at least one test node 330 and at least one protected server image 332.

The disaster recovery appliance 314 includes recovery software 334, a protected server image 336 and a disaster recovery node 338 which in turn includes a protected server image 340. In addition, the disaster recovery appliance 314 includes, as-needed, a test environment 342 including at least one test node 344 and at least one protected server image 346.

The protected server 310 may be a server operating as a web server, database server, mail server, FTP server or any number of other servers. The protected server 310 may be a member of a local network and may utilize access to or interact with one or more other servers or other computers on the local network.

The protected server 310 may include settings and elements such as a static IP address, domain membership, network settings, operating system settings, software and hardware dependencies in addition to other computer settings and data. The protected server 310 performs its functions while it is being protected by the recovery node test system 300.

The protected server 310 executes the recovery software 318 that interfaces and communicates with the recovery software 320, 334 to create and maintain the protected server images 322, 336. The protected server image 322 is shown within the high availability appliance 312. The recovery software 318, 320, 334 enable the protected server 310, high availability node 324 and the disaster recovery node 338 to communicate and to control the protected server 310 in order to create protected server images 322, 336 and, if necessary, to restore or recreate the protected server 310.

The high availability appliance 312 includes the high availability node 324 capable of booting and operating the protected server image 326 as a virtual machine in order to perform all of the functions and utilizing all of the settings and data of the protected server 310. The high availability appliance 312 includes the high availability node 324 that may execute the protected server image 326 as a virtual machine. The high availability appliance 312 may be on the same local network as the protected server 310. The high availability appliance 312, using the high availability node 324, may act as a stand-in for the protected server 310 in the event that a failure in the protected server 310 is detected. The high availability appliance 312 may simultaneously serve to protect a number of protected servers 310, each using a different high availability node, each using a protected server image associated with one of the protected servers.

The high availability appliance 312 includes recovery software 320 that is used to schedule the creation of the protected server image 322. The recovery software 320 may operate on the high availability appliance 312 in concert with the recovery software 318 on the protected server 310 to create the protected server image 322 at regular intervals, such as at scheduled backup times, incrementally or dynamically as settings and files associated with the protected server 310 change. The recovery software 320 may also be used to select the data, files, and settings that are to be included in the protected server image 322, if less than a complete image is to be created. The high availability appliance 312 is able to do this because it is substantially idle while operating in a standby mode awaiting failure of the associated protected server 310.

The high availability node 324 includes or has ready access to the protected server image 326, a copy of protected server image 322. The protected server image 326 may be used as a bootable image of the protected server 310 including all of the associated protected server 310 settings and data. The protected server image 326 may be one of many images, each associated with a protected server that may be created over time. The high availability node 324 can then operate in place of the protected server 310 upon loading and booting the protected server image 326. The high availability node 324 may boot up the protected server image 326 and operate in exactly the same way as though it were the protected server 310 in the event of a failure of the protected server 310.

Because the high availability node 324 on the same network as the protected server 310, all the local and remote network resources necessary for the protected server 310 to function are available to the high availability node 324 immediately upon startup. If there are dependencies between, for example, a database server and the protected server 310, the same dependencies will exist between the database server and the high availability node 324, once booted with the protected server image 326. However, no configuration of the high availability node 324 will be necessary because the high availability node 324 will take the place of the protected server 310 on the same network.

The test environment 328, test node 330 and protected server image 332 will be discussed below in conjunction with the test environment 342, test node 344 and protected server image 346.

The disaster recovery appliance 314 is a server that is intentionally remote from the protected server 310 and the high availability appliance 312. The disaster recovery appliance 314 includes at least one disaster recovery node 338. The disaster recovery node 338 may operate as a virtual machine in order to boot the protected server image 340, a copy of the protected server image 336, in a manner similar to that of the high availability node 324. The recovery software 334 works with the recovery software 320 on the high availability appliance 312 to periodically update the protected server image 336 in a manner similar to that for the high availability appliance 312.

The disaster recovery node 338 may be used to create a new protected server 310 to take the place of the original in the event of a failure of the protected server 310 and the high availability node 324. The disaster recovery node 338 may also be capable of operating, at a remote location, in place of the protected server 310 in much the same way that the high availability node 324 is capable of functioning.

The protected server image 336 stored in the disaster recovery appliance 314 may be bootable immediately upon uploading to a new protected server 310 so that a failed protected server 310 may be replaced as quickly as possible. In addition, the recovery software 334 has access to all of the relevant settings associated with the network upon which the protected server 310 operates. These settings may be maintained as a part of the protected server image 336 or may be maintained separately. In addition, the disaster recovery node 338 may operate using the protected server image 340 in place of the protected server 310 until the protected server image 336 can be used to recreate the protected server 310.

Two test environments 328, 342, along with at least one associated test node 330, 344 and at last one protected server image 332, 346, respectively, may used to test the adequacy of the protected server images 322, 336 to replace the protected server 310 in the event of a failure. These test environments 328, 342 may be either in the high availability appliance 312 or the disaster recovery appliance 314 (or both) as desired by an administrator of the system 300. In order to test a protected server image 322, 336, only one of the test environment 328 or test environment 342 need be used. However, the administrator may choose to utilize either of the appliances 312, 314 to test the protected server images 322 or 336, respectively.

The test nodes 330, 344 operate within the test environments 328, 342, respectively. Each test node 330, 344 includes a protected server image 332, 346. These protected server images 332, 346 are copies of the protected server images 322, 336, respectively. These protected server images 332, 346 may be copied as-needed for testing. Multiple test environments 328, 342 and test nodes 330, 344 may operate simultaneously on the high availability appliance 312 or disaster recovery appliance 314. In addition, each test environment 328, 342 may include a plurality of test nodes 330, 344.

The test environments 328, 342 are virtualized version of the network, domain, dependencies and other settings associated with the protected server 310 (or a set of protected servers). The test environments 328, 342 are isolated from the Internet or the local network on which the protected server 310. The test environments 328, 342, the test nodes 330, 344 and the associated protected server images 332, 346 may be created dynamically at test time in order to perform the test and then may be deleted or disabled when no test is being performed.

The test environments 328, 342 may include access to or emulation of servers or other resources upon which the test nodes 330, 344 may depend. For example, if the test nodes 330, 344 (acting as though they are the protected server 310) require access to a database server in order to function properly, then access to that database server or an emulated version of the database server may be provided as a part of the test environment. All elements necessary for the test nodes 330, 344 to operate in the same manner as the protected server are provided. Access to actual network resources, such as database servers or dependent servers may be provided by the test environments 328, 342. However, the test nodes 330, 344 will not disturb the operations of the network resources or the protected server 310.

There may be multiple protected servers in a given network. Each of these protected servers may be associated with a high availability appliance 312 and a disaster recovery appliance 314. A single high availability appliance 312 or disaster recovery appliance 314 may serve multiple protected servers 310 simultaneously. When a protected server 310 depends upon another protected server in the network, the two images of those servers may be tested simultaneously in the test environment 328, 342. For example, a protected server 310 such as an email server may depend upon a domain controller or a database server. The images of each of the protected server 310, domain controller and database server may be initiated as separate test nodes 330, 344 (each using their own protected server images 332, 346) within the same test environment 328, 342 so that they may interact one with another including their dependencies. In this way, the capabilities of each may be simultaneously tested.

The recovery software 318 operating on the protected server 310 may be used to gather the network settings, dependencies and other settings associated with the protected server 310. These settings may include required interactions or interrelations between the protected server 310 and other servers. For example, if the protected server 310 is primarily a Microsoft® Exchange server, it may require access to a domain controller in order to operate appropriately. Because the recovery software 318 is active on the protected server, 310, the recovery software 318 will be able to discover that dependency and to store settings associated with the dependency.

Using the protected server image 332, 346 to operate the test node 330, 344 in the test environment 328, 342 emulating the actual environment of the protected server 310 enables the recovery node test system 300 to ensure that the protected server image 322, 336 is adequate to replace the protected server 310 in the event of a failure. The use of a test environment 328, 342 and a test node 330, 344 also ensures that the high availability node 324, the disaster recovery node 338 and the protected server image 322, 336 are not disrupted or disturbed. Disrupting the high availability node 324 or the disaster recovery node 338, even for a short while, to test them may result in image corruption, downtime or other unavailability.

The use of the test environment 328, 342 also ensures that the testing of the protected server image 322, 336 is as full as possible without actually replacing, temporarily or permanently, the protected server 310. Because the test environment 328, 342 is isolated from the network of the protected server 310, it can utilize all the same settings as the protected server 310 without causing network conflicts, overwriting databases, disturbing dependencies or otherwise disrupting the service of the protected server 310.

The web interface 316 is an Internet-accessible software system hosted on a web server. The web interface 316 is for directing the recovery software 318, 320, 334 in order to schedule and create protected server images. The web interface 316 may also be used to request or schedule tests of the protected server images 322, 336 using the test node 330, 344 in the test environment 328, 342. The web interface 316 may also be used to selectively determine which elements, if less than all, of the protected server 310 to include in the protected server images.

Description of Processes

Figure 4:
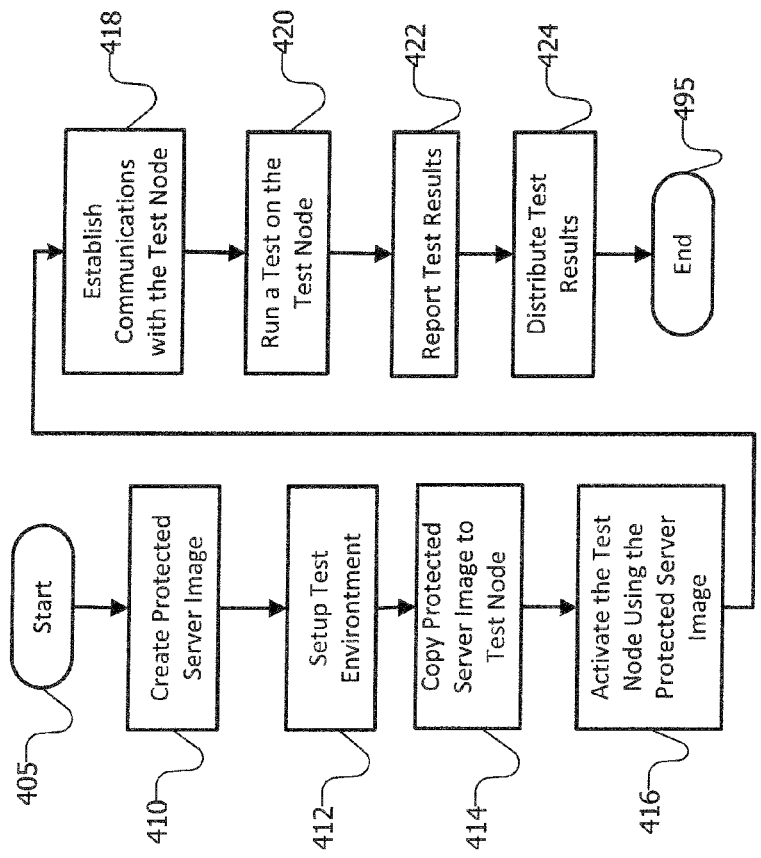
FIG. 4 is a flowchart of a recovery node test procedure.

Referring now to FIG. 4, a flowchart of a recovery node test procedure is shown. The method of FIG. 4 may be performed in the system of FIG. 3.

First, a protected server image, such as protected server images 322, is created at 410. This image is created using the recovery software 318 installed on the protected server 310 acting in concert with the recovery software 320 on the high availability appliance 312. The protected server images 322 includes all of the software, settings and data associated with a protected server 310 and may be bootable upon copying to a computing device capable of running the bootable image.

The protected server image 322 is created in response to a request initiated by the web interface 316 and carried out by the recovery software 320. The protected server image 322 may be stored alongside a series of such images, each made over time. The protected server image 322 may overwrite or delete previous versions of itself after a predetermined period of time or number of new images have been created.

The protected server image 322 may be created in the high availability appliance 312 and then copied to the disaster recovery appliance 314 as the protected server image 336. Alternatively, both the protected server image 322 and the protected server image 336 may be created simultaneously. If the protected server images 322, 336 are not created simultaneously in both locations, the single created one may be transmitted to the disaster recovery node 338 that is remote from the high availability appliance 312 and protected server 310.

Next, the test environment, such as the test environments 328 and 342 are set up in either the high availability appliance 312 or the disaster recovery appliance 314 at 412. These test environments 328 and 342 are virtualized network environments that may include other test nodes, emulated or simulated servers or users. The virtual network environments serve to isolate the test environments 328, 342 from the network upon which the protected server 310 and high availability appliance 312 are operating. The remainder of the description of FIG. 4 is made with reference to the protected server image 332, test node 330 and test environment 328, though, each of the described functions may also be performed by the protected server image 346, test node 344 and test environment 342 as-needed or desired by an administrator of the system 300.

The test environment 328 incorporates the network settings, software and hardware dependencies, resources, data sources and other network elements utilized by the protected server 310. These settings may include the operating system of the protected server 310, data stored on the protected server 310, applications stored and intended to run on the protected server 310, services running on the protected server 310 and the names, domain names, internet protocol addresses, proxies, uniform resource locator addresses associated with the protected server 310.

In addition, any settings that establish a relationship between the protected server 310 and database servers, web servers, proxies, domain name servers, network data stores and similar elements are included. These settings may include authentication protocols or credentials such as usernames, passwords, authentication certificates, dependencies, startup scripts, protocols that require a series of steps to occur in a pre-determined order, a series of known network requests and acknowledgements or other responses and similar elements.

The resources may include actual or emulated database servers, web servers, email servers, servers that are used to generate simple message service (SMS) text messages, error logging servers, billing or shipping servers, inventory or other logistics servers, large scale, cloud, and other storage systems and similar resources. The test environment 328 may have obtain access to each of these resources, for example using the recovery software 318 on the protected server 310, and may be configured using each of these settings.

The protected server image 322 is copied as protected server image 332 to the test node 330 operating within the test environments 328 at 414. This copy may be made from the high availability appliance 312 or the disaster recovery appliance 314. In either case, the copying may be controlled or scheduled by the web interface 316 and executed by the recovery software 320 or 334. Once copied, the test node 330 is activated using the protected server image 332 at 416. Activation includes booting the bootable protected server image 332 and providing access to any necessary dependencies and settings.

Access to the actual network resources available to the protected server 310 may impair, damage, conflict with or otherwise impede operation of the protected server 310. Accordingly, the test environment 328 elements may be emulated, partially-emulated or booted images of other protected servers running on the same or additional test nodes to the extent necessary to test the protected server image 332 on the test node 330.

The protected server 310 may require one or more dependencies in order to operate appropriately. For example, for a web server, access to one or more database servers, inventory or logistics systems, cloud storage of web content, email servers or access to additional web servers may be required for the protected server 310 to operate. As the protected server 310 is booted, it may require that one or more of these servers be active already or require a response from one or more of these servers during the boot-up process. The settings associated with these dependencies are also stored in the protected server image 322 and 332 (once copied to the test node 330) and taken into account by the test environment 328 so that emulated servers or responses necessary for boot up of the protected server image 332 will be available during the testing procedure.

The test environment 328 minors or emulates the actual environment in which the protected server 310 operates to the extent possible. In this way, the test node 330, operating in the test environment 328 is unaware that it is not actually the protected server 310. Testing of the test node 330 using the protected server image 332 is as accurate and complete as possible without actually performing a restoration of the protected server 310 from the protected server image 332.

Once the test environment 328 and test node 330 are set up, the test node 330 is then activated using the protected server image 332 at 416. The protected server image 332, copied at 414, is booted as the test node 330. If there are any dependencies between the protected server 310 and external elements, the external elements upon which the test node 330 depends in the test environment 328 are first started, enabled or emulated.

Next, communications with the test node 330 are established at 418. At this stage, the recovery software 320 in conjunction with the web interface 316 establish communications with the booted test node 330. These communications may be virtual private network access, command-line access, screen sharing or other methods. This process may be automated and may utilize one or more different methods of communication in serial or parallel to complete testing as quickly as possible.

Next, a test is run on the test node 330 at 420. The test may be a series of requests or actions that emulate typical user or administrator interactions with the protected server 310 now being used on the test node 330 instead. In some cases, direct administrator access to the test node 330 may be a part of the test run on the test node 330 at 420. In this way, an administrator of the system 300 can confirm that the test node 330 is demonstrating normal behavior as though it were a protected server 310. In addition, the test described at 420 may be a single request or may be a series of multi-faceted requests, actions and data access requests to be performed by the test node 330 acting as though it were the protected server 310. Generation of a screenshot of the operating test node 330 showing that it is functioning normally may also be a part of the test.

An administrator, using the web interface 316, may set the parameters of the testing procedure. An administrator may wish to test a particular aspect of the protected server image 332 running on the test node 330. For example, the administrator may wish to test the capability of the test node 330 to access a database server available to the protected server 310. Alternatively, the administrator may wish to test the capability of the test node 330 to process an order or to act as a web server serving content hosted elsewhere. The administrator may create various automated testing procedures to accomplish these tasks using the web interface 316.

The administrator may also set up specific aspects of the test environment 328 for use in testing. For example, the administrator may set up the test environment 328 to forward particular internet ports to known locations or may cause requests to specific network resources to prompt responses of a known or predetermined type or format. Automated tools available to the web interface 316 may also aid in creating some or all of these aspects of the test environment 328. In this way, the administrator can set up the test environment to act as closely as possible to that of the actual environment in which the protected server image 332 would be introduced in the event of a system failure without interrupting normal operation of the protected server 310, high availability appliance 312 or disaster recovery appliance 314.

The test results are then reported to the web interface 316 at 422. The report may consist only of a positive or negative response, for example, indicating that the test node 330 completed each of the previously-selected tests without error. An error in one of the tests may prompt only information pertaining to the test including the error and an indication that all other tests completed successfully. A full report disclosing each of the steps in each of the tests and the results of each step may also be provided. These results may be used by an administrator to review the sufficiency of the test in addition to the capabilities of the test node 330 using the protected server image 332. The results may also include a screen shot of the operating test node 330 visible to a user of the web interface 316.

The test results may then be distributed by the web interface 316 at 424. This distribution may be to recipients listed on an email list, to a distribution group via simple message server (SMS) text messaging, via a login screen on the web interface 316 associated with an administrator or other notification method. Logs of the results may also be created for review, analysis or storage. Through various distribution methods, the administrators of the recovery node testing system 300 may be notified.

A successful test indicates that the high availability appliance 312 and the disaster recovery appliance 314 incorporating the protected server image 322 and protected server image 336, respectively, are prepared to operate in place of or to replace the protected server 310 in the event of a system failure. All of the testing is accomplished without disturbing the normal operations of either node 324, 338 and without disturbing the protected server images 322, 336.

By booting the protected server image 332 on the test node 330 and then testing its capabilities in a test environment 328 similar or identical to that of the protected server 310, the integrity and functionality of the protected server images 322, 336 can be confirmed. This adds a second level of reassurance that the protected server images 322 and 336 will function as needed in the event of a system failure. This added level of reassurance is not available in systems that merely confirm that system images are bootable or that confirm their file integrity.

The flow chart has both a start 405 and an end 495, but the process may be cyclical in nature, for example, with all or a portion of the elements of the flow chart taking place on a regular basis.

Closing Comments

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

It is claimed:

1. A recovery node testing system comprising a high availability appliance including a test node operating in a high availability appliance processor, the test node for:
    copying a protected server image associated with a protected server into the test node on the high availability appliance;
    activating the protected server image on the test node within a test environment operating on the high availability appliance, the test environment including at least one network characteristic of a network associated with the protected server; and
    communicating with the protected server image operating on the test node in the test environment to thereby perform a test to confirm that the protected server image on the test node responds within the test environment in the same manner as the protected server, and thereafter, communicating with a disaster recovery appliance to transmit the protected server image to the disaster recovery appliance without interrupting operation of the high availability appliance.

2. The system of claim 1 wherein the high availability appliance further includes recovery software for:
creating the protected server image from the protected server; and
transmitting the protected server image to a disaster recovery appliance.

3. The system of claim 2 further comprising a high availability node suitable for acting as a replacement for the protected server, using the protected server image on the test node, in the event of a failure of the protected server.

4. The system of claim 1 further including a web interface for:
scheduling the creation of the protected server image; and
scheduling the test on the test node to confirm that the protected server image operating on the test node responds in the same manner as the protected server.

5. The system of claim 1 wherein the test includes confirmation that the test node interaction with another resource available in the test environment conforms to an expected interaction of the protected server.

6. The system of claim 1 wherein the test environment includes emulation of at least one network resource available to the protected server.

7. A recovery node testing method comprising:
storing a protected server image associated with a protected server on a test node;
activating the protected server image on the test node within a test environment including at least one network characteristic of a network associated with the protected server; and
communicating, using the protected server image, with the test environment to thereby perform a test to confirm that the protected server image responds within the test environment in the same manner as the protected server and, thereafter, communicating with a selected one of a disaster recovery appliance or a high availability appliance to transmit the protected server image on the test node to the selected one without interrupting operation of the unselected appliance.

8. The method of claim 7 wherein the test node is dynamically created as-needed for testing on the high availability appliance.

9. The method of claim 8 wherein the high availability appliance incorporates a high availability node suitable for acting as a replacement for the protected server in the event of a failure of the protected server.

10. The method of claim 7 wherein the test node is dynamically created as-needed for testing on the disaster recovery appliance.

11. The method of claim 7 further comprising:
creating the protected server image from the protected server using recovery software operating on the protected server; and
transmitting the protected server image, stored on the test node, to the high availability appliance and to the disaster recovery appliance.

12. The method of claim 7 further comprising:
scheduling the creation of the protected server image; and
scheduling the test on the test node to confirm that the protected server image operating on the test node responds in the same manner as the protected server.

13. The method of claim 12 wherein the test includes a confirmation that the test node interaction with another resource available in the test environment conforms to the expected interaction of the protected server.

14. The method of claim 12 wherein the test environment includes emulation of at least one network resource available to the protected server.

15. Apparatus comprising a storage medium storing a program having instructions which when executed by a processor will cause the processor to:
store a protected server image associated with a protected server to a test node in a disaster recovery appliance;
create a test environment for the test node, the test environment including at least one of the network characteristics of a network associated with the protected server;
activate the test node using the protected server image stored on the test node within the test environment;
perform a test to confirm that the protected server image responds within the test environment in the same manner as the protected server; and
communicate with a high availability appliance to thereby receive the protected server image without interrupting operation of the disaster recovery appliance.

16. The apparatus of claim 15 wherein the instructions further cause the processor to:
store a result of the test of the protected server image on the test node; and
communicate the result of the test to a web interface.

17. The apparatus of claim 15 wherein a high availability node operating on the high availability appliance may use the protected server image on the test node to operate in place of the protected server in the event of a failure of the protected server.

18. The apparatus of claim 15 wherein the test is performed in accordance with a schedule created using a web interface.

19. The apparatus of claim 15 wherein the test includes the creation of a screen capture image of the protected server image operating on the test node.

* * * * *